US006582630B2

United States Patent
Jain et al.

(10) Patent No.: US 6,582,630 B2
(45) Date of Patent: Jun. 24, 2003

(54) METHOD OF FABRICATING AND INTEGRATING AN OPTICAL ASSEMBLY INTO A FLYING HEAD

(76) Inventors: Amit Jain, 15537 Owens Glen Ter., North Potomac, MD (US) 20878; Gordon R. Knight, 21305 Canyon View Dr., Saratoga, CA (US) 95070; James M. McCoy, 360 Menlo Oaks Dr., Menlo Park, CA (US) 94025; Allan Schwartz, 919 Cape George Pl., San Jose, CA (US) 95133; Arnie O. Thornton, 3141 Hostetter Rd., San Jose, CA (US) 95132

( * ) Notice: Subject to any disclaimer, the term of this patent is extended or adjusted under 35 U.S.C. 154(b) by 68 days.

(21) Appl. No.: 09/821,849

(22) Filed: Mar. 28, 2001

(65) Prior Publication Data

US 2002/0011298 A1 Jan. 31, 2002

Related U.S. Application Data

(62) Division of application No. 08/657,145, filed on Jun. 3, 1996, now Pat. No. 6,270,696.

(51) Int. Cl.[7] .................. B29D 11/00; G11B 5/127; G11B 7/22

(52) U.S. Cl. .................. 264/1.1; 264/2.7; 156/245; 360/235.4; 369/44.14; 369/112.01

(58) Field of Search .................. 156/242, 245; 264/1.1, 1.32, 2.7; 360/234.3, 246.2, 235.4; 369/112.01, 112.08, 112.13, 112.23, 44.23, 44.14, 44.15, 44.16; 359/811

(56) References Cited

U.S. PATENT DOCUMENTS

| 4,410,241 A | * 10/1983 | De Lang et al. ............ 358/348 |
|---|---|---|
| 4,425,504 A | * 1/1984 | Turnbull et al. ............ 250/353 |
| 4,633,450 A | 12/1986 | Gueugnon .................... 369/13 |
| 4,753,521 A | 6/1988 | Deserno ...................... 359/663 |
| 4,794,586 A | 12/1988 | Korth .......................... 369/215 |
| 4,965,780 A | 10/1990 | Lee et al. ..................... 369/13 |
| 4,987,292 A | 1/1991 | Howard .................... 250/201.5 |
| 5,004,307 A | 4/1991 | Kino et al. ................... 350/1.2 |
| 5,020,040 A | 5/1991 | Lee ............................. 369/13 |
| 5,105,408 A | 4/1992 | Lee et al. ................. 369/44.15 |
| 5,112,662 A | 5/1992 | Ng .............................. 428/64 |

(List continued on next page.)

FOREIGN PATENT DOCUMENTS

JP 1-61308 3/1989

OTHER PUBLICATIONS

Hayashi, S., et al., "Solid Immersion Lens for Optical Storage," Stanford University, G.L. Report No. 5258, Feb. 1995 (9 page document).

Ichimura, Isao, et al., "High Density Optical Recording Using a Solid Immersion Lens," Stanford University, G.L. Report No. 5371, Nov. 1995, pp. 1–22 and Figs. 1–17.

Mamin, H.J., et al., "High density optical recording with a flying solid immersion lens," presented at the Optical Data Storage Conference in San Diego, California in May, 1995, pp 1–2.

(List continued on next page.)

*Primary Examiner*—Michael W. Ball
*Assistant Examiner*—John T. Haran

(57) ABSTRACT

Several embodiments of a method for manufacturing an optical assembly for use in an optical flying head are provided. The optical assembly may include a solid immersion lens and a magnetic coil. Techniques are provided for fabricating the solid immersion lens and the magnetic coil. Techniques are also provided for installing the optical assembly into a slider for the optical flying head. Other embodiments are described in which a solid immersion lens is installed in or is integral with a transparent slider. A magnetic coil may also be installed in these embodiments.

15 Claims, 8 Drawing Sheets

U.S. PATENT DOCUMENTS

| | | | |
|---|---|---|---|
| 5,115,363 A | 5/1992 | Khan et al. | 360/104 |
| 5,120,603 A | 6/1992 | Schmidt | 428/336 |
| 5,121,256 A | 6/1992 | Corle et al. | 359/356 |
| 5,125,750 A | 6/1992 | Corle | 359/819 |
| 5,128,216 A | 7/1992 | Ng | 428/695 |
| 5,153,870 A | 10/1992 | Lee et al. | 369/111 |
| 5,161,134 A | 11/1992 | Lee | 369/13 |
| 5,182,444 A | 1/1993 | Howard | 250/201.5 |
| 5,191,563 A | 3/1993 | Lee et al. | 369/13 |
| 5,197,050 A | 3/1993 | Murakami et al. | 369/13 |
| 5,202,880 A | 4/1993 | Lee et al. | 369/275.4 |
| 5,223,710 A | 6/1993 | Pavlak | 250/230 |
| 5,232,570 A | 8/1993 | Haines et al. | 204/192.16 |
| 5,243,241 A | 9/1993 | Wang | 310/36 |
| 5,247,510 A | 9/1993 | Lee et al. | 369/118 |
| 5,255,260 A | 10/1993 | Yamada et al. | 369/199 |
| 5,260,928 A | 11/1993 | Lee et al. | 369/112 |
| 5,288,997 A | 2/1994 | Betzig et al. | 359/356 |
| 5,295,122 A | 3/1994 | Murakami et al. | 369/13 |
| 5,307,336 A | 4/1994 | Lee et al. | 369/112 |
| 5,381,402 A | 1/1995 | Lee et al. | 369/291 |
| 5,402,293 A * | 3/1995 | Smith | 360/114 |
| 5,432,763 A | 7/1995 | Campbell et al. | 369/44 |
| 5,445,011 A | 8/1995 | Ghislain et al. | 250/306 |
| 5,450,379 A | 9/1995 | Fujimori et al. | 369/275.1 |
| 5,452,283 A | 9/1995 | Lee et al. | 369/112 |
| 5,467,238 A | 11/1995 | Lee et al. | 360/128 |
| 5,470,627 A | 11/1995 | Lee et al. | 428/64.4 |
| 5,486,970 A | 1/1996 | Lee et al. | 360/128 |
| 5,497,359 A * | 3/1996 | Mamin et al. | 369/44.15 |
| 5,504,731 A | 4/1996 | Lee et al. | 369/112 |
| 5,506,828 A | 4/1996 | Kanno et al. | |
| 5,541,888 A | 7/1996 | Russell | 369/112 |
| 5,602,819 A | 2/1997 | Inagaki et al. | 369/112 |
| 5,602,820 A | 2/1997 | Wickramasinghe et al. | 369/126 |
| 5,631,893 A | 5/1997 | Kang et al. | 369/44.15 |
| 5,729,393 A * | 3/1998 | Lee et al. | 359/819 |
| 5,881,042 A * | 3/1999 | Knight | 369/112 |
| 6,243,350 B1 * | 6/2001 | Knight et al. | 369/126 |
| 6,307,832 B1 * | 10/2001 | Novotny et al. | 369/300 |
| 6,449,221 B1 * | 9/2002 | Knight et al. | 369/13.35 |

OTHER PUBLICATIONS

Terris, B.D., et al., "Near–field optical data storage using a solid immersion lens," *Applied Physics Letters*, 65 (4), Jul. 25, 1994, pp. 388–390.

Maeda, Fumisada, et al., "High Density Optical Disk System Using a New Two–Element Lens and a Thin Substrate Disk", Research Center, Sony Corporation, pp. 342–344.

Betzig, E., et al., "Near–field magneto–optics and high density data storage", *Appl. Phys. Lett.*, vol. 61, No. 2, pp. 142–144, Jul. 13, 1992.

Maeda, F., et al., "High density optical disk system using a new two–element lens and a thin substrate disk", *Technical Digest, 1996 International Symposium on Optical Memory and Optical Data Storage*, pp. 342–344, 1996.

Mansfield, S., et al., "High–numberical–aperture lens system for optical storage", *Optics Letters*, vol. 18, No. 4, pp. 305–307, Feb. 15, 1993.

Mansfield, S., et al., "Solid immersion microscope", *Appl. Phys. Lett.*, vol. 57, No. 24, pp. 2615–2616, Dec. 10, 1990.

Yamamoto, K., et al., "A 0.8 Numerical Aperture Two Element Objective Lens for the Optical Disk", *Technical Digest. 1996 International Symposium on Optical Memory and Optical Data Storage*, pp. 345–347, 1996.

G.S. Kino, "High Density Storage with a Solid Immersion Lens", *Ginzton laboratory, Stanford University*.

* cited by examiner

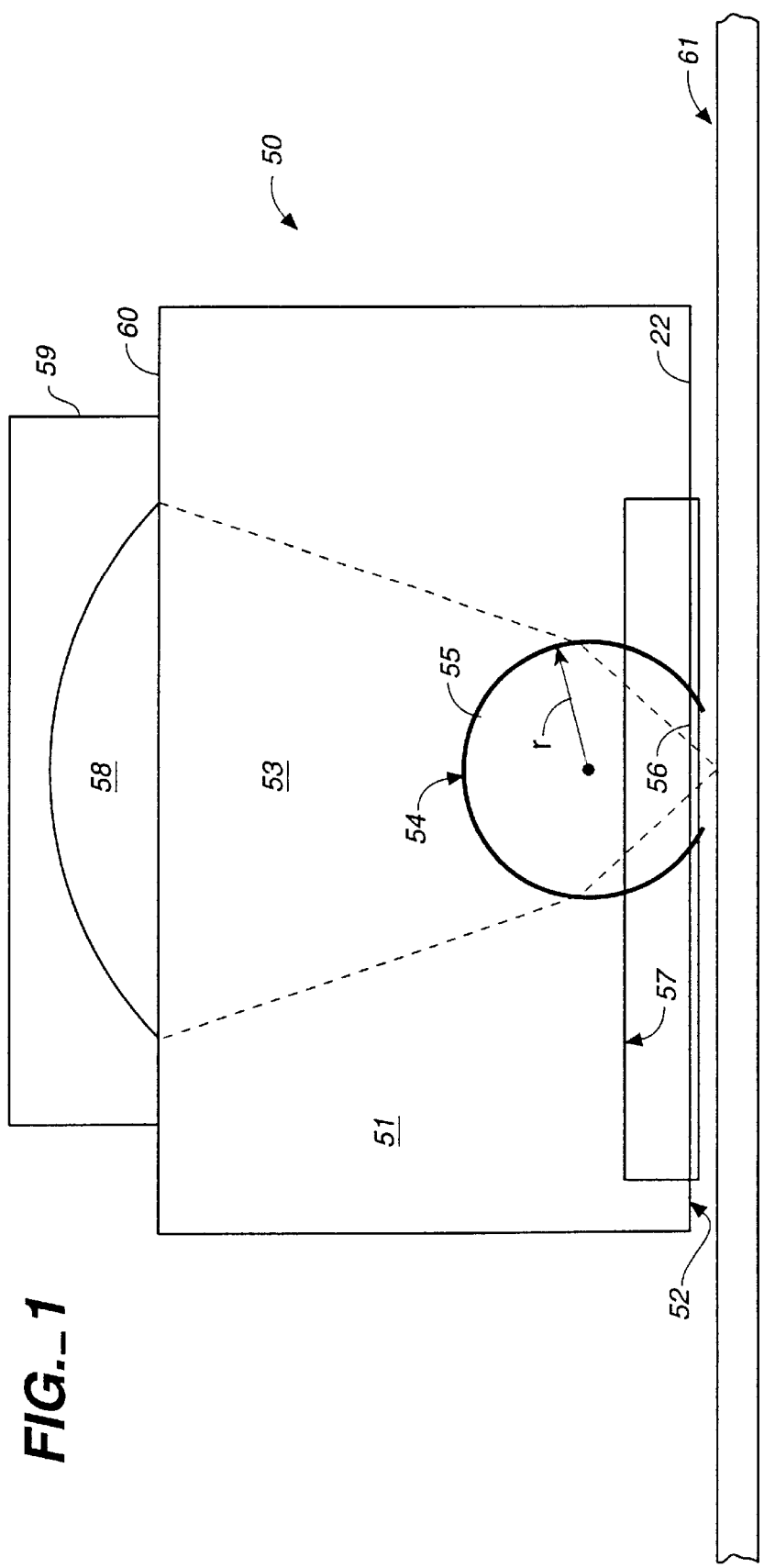
FIG._1

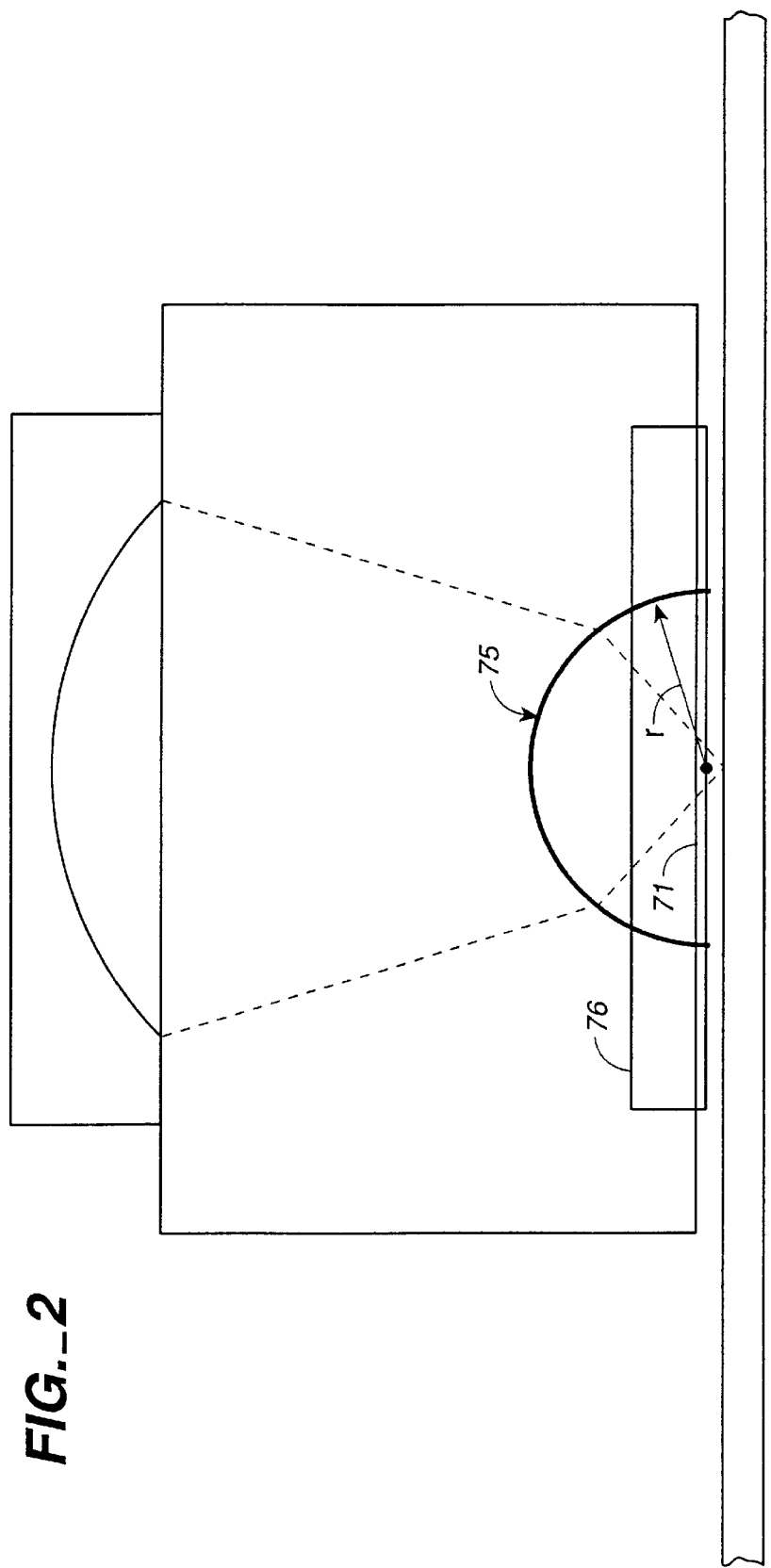
FIG._2

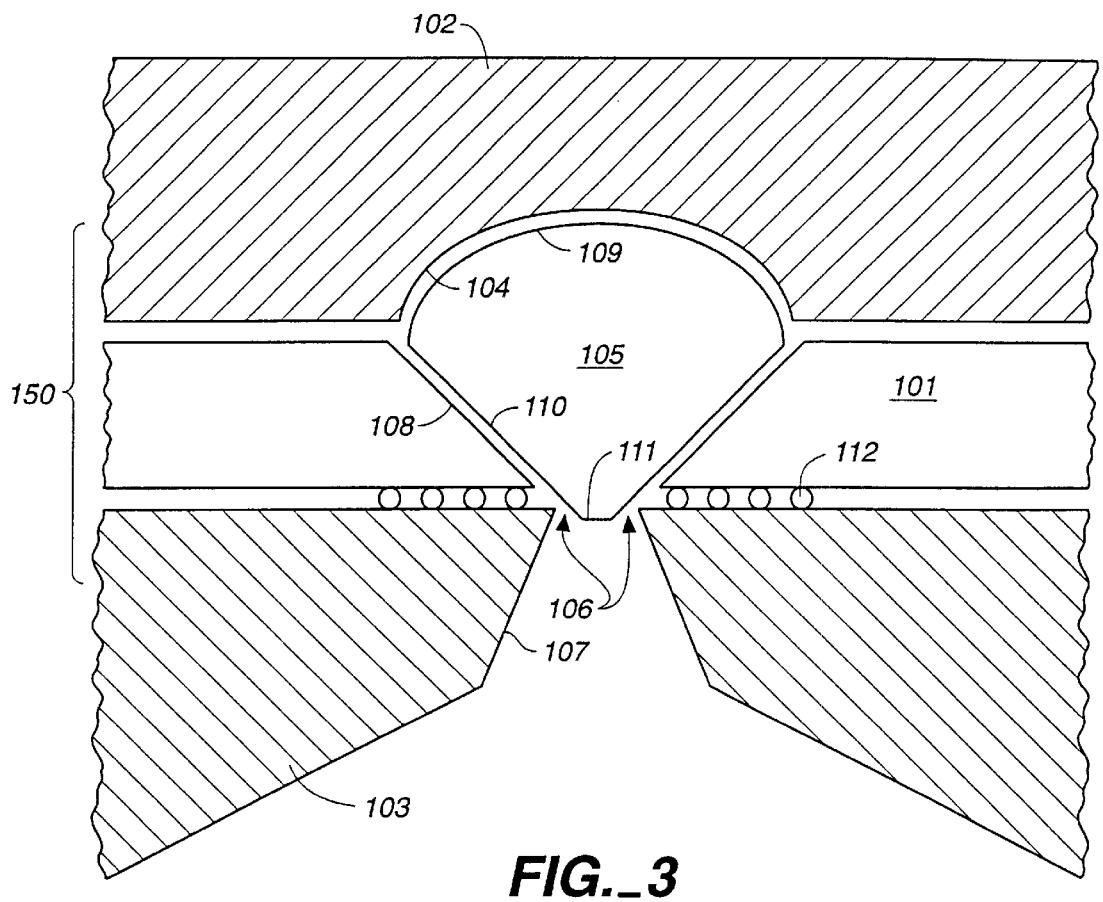
FIG._3

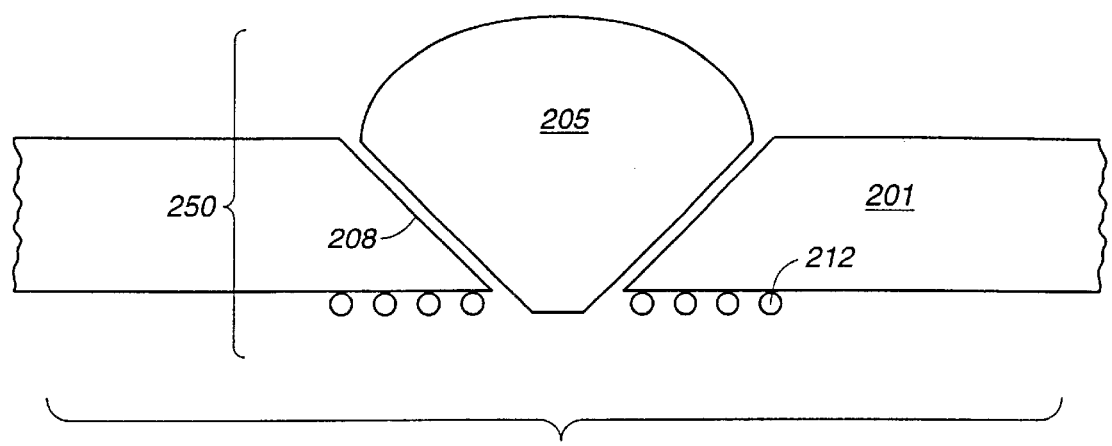
FIG._4
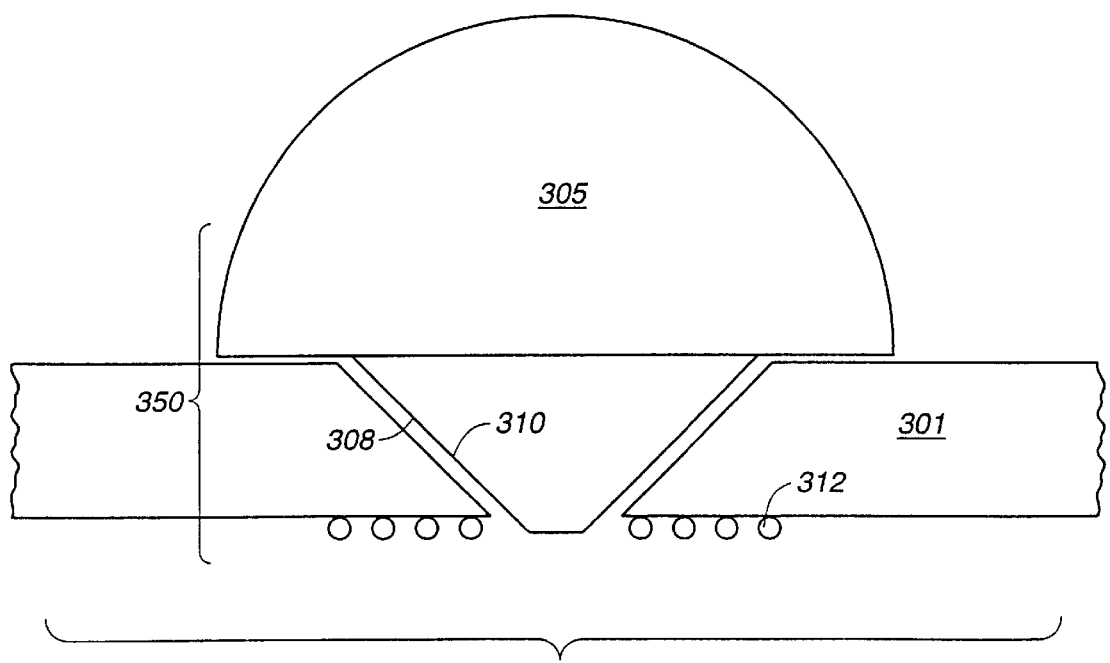
FIG._5

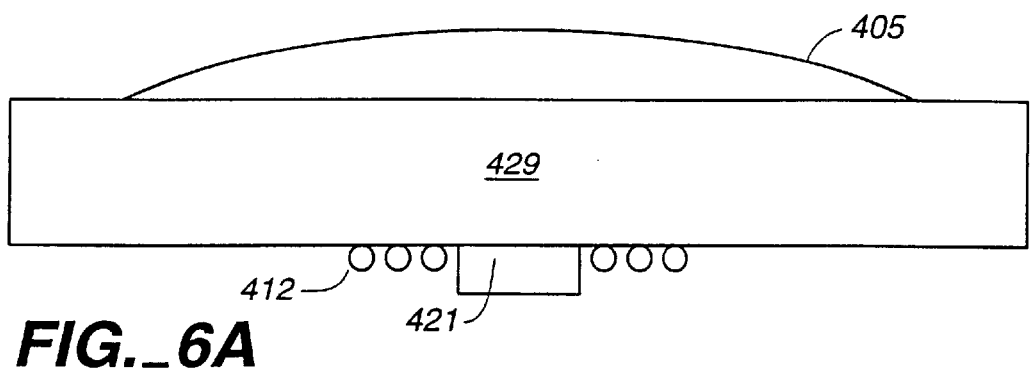
FIG._6A
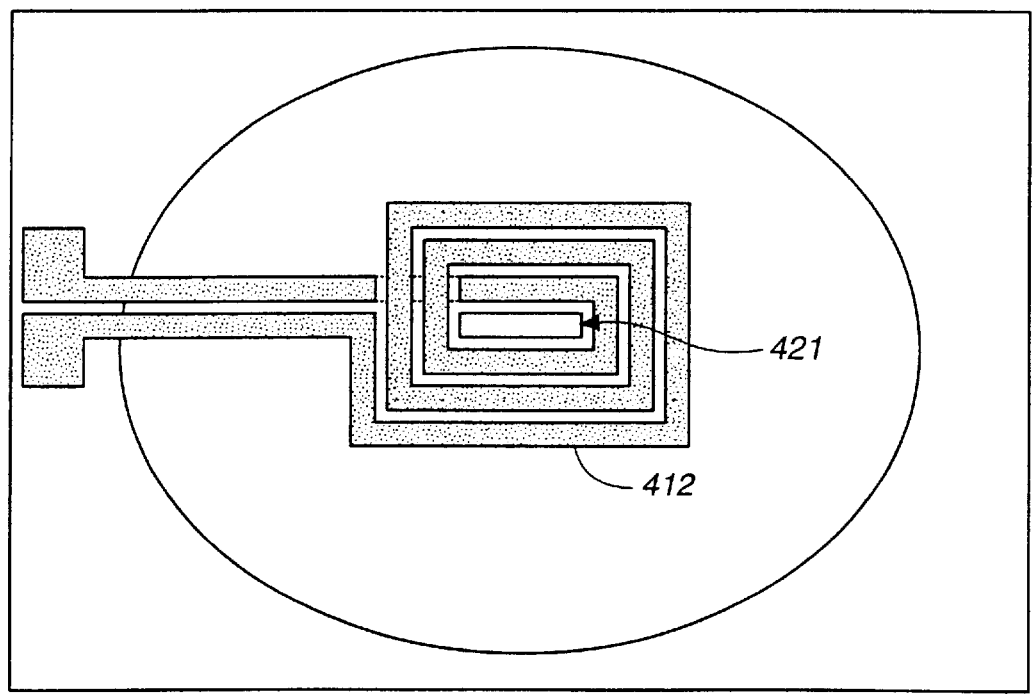
FIG._6B

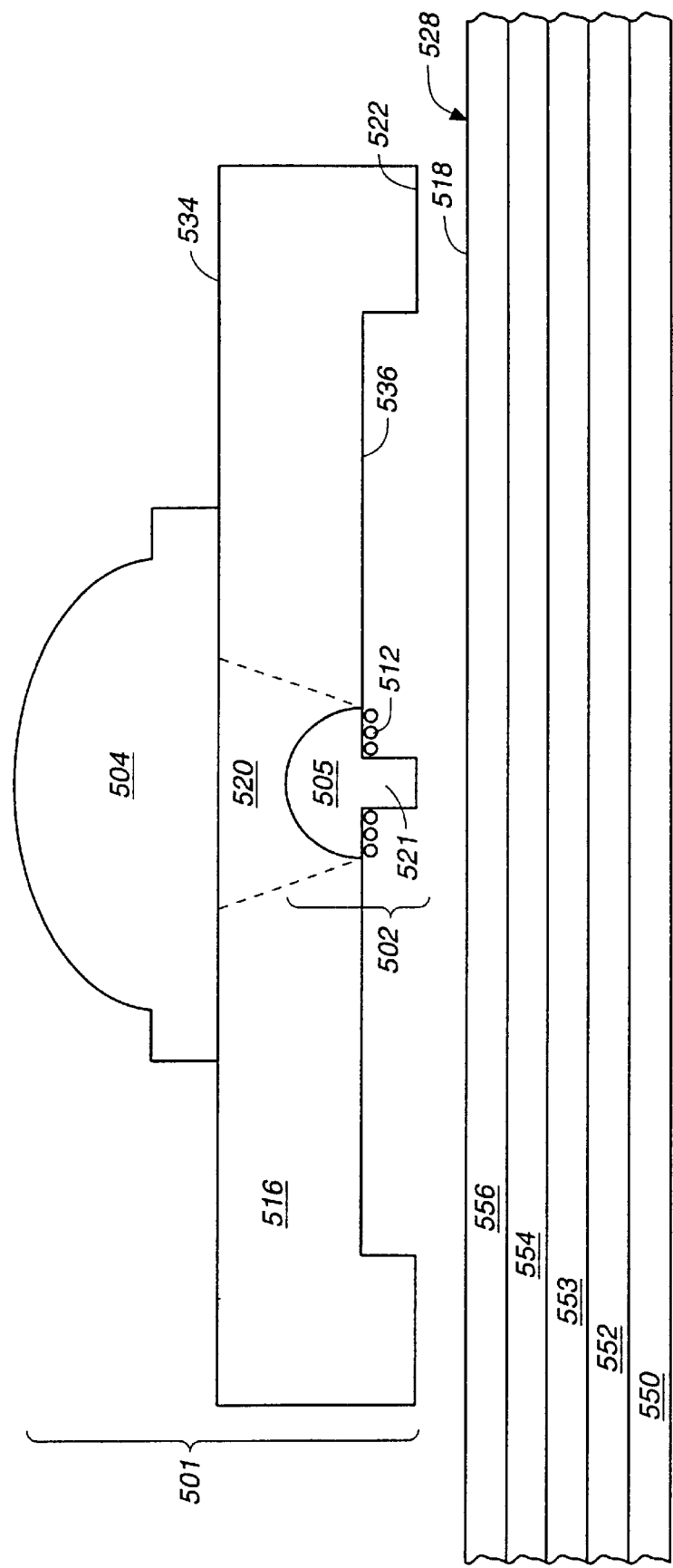
FIG._7

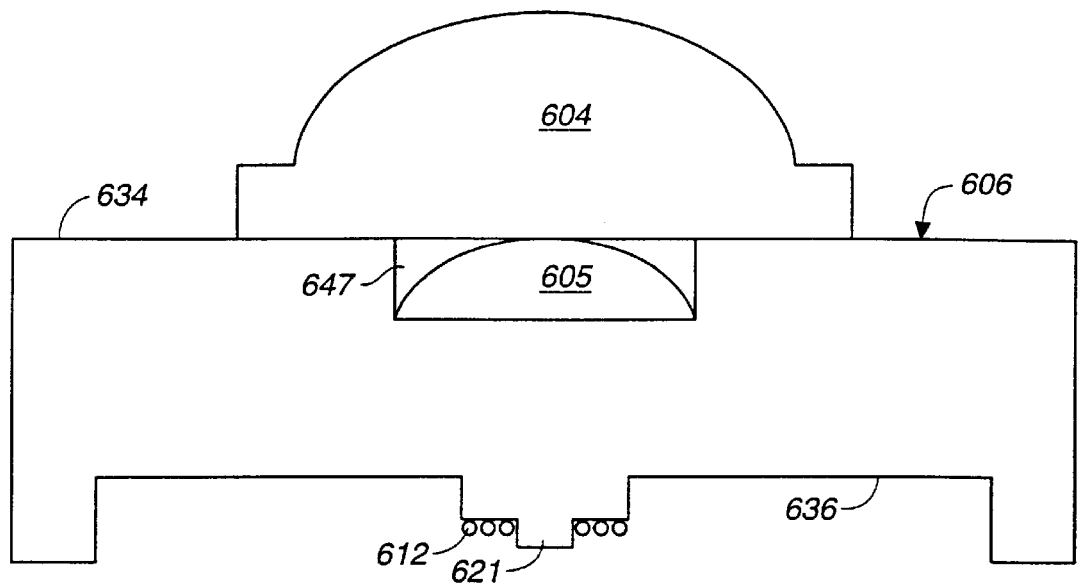
FIG._8
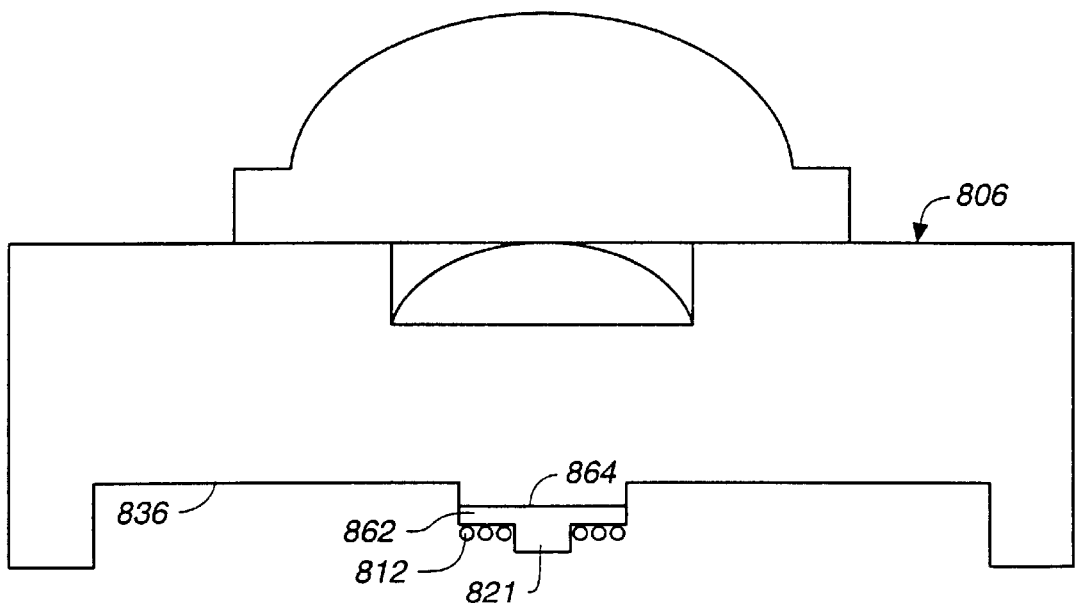
FIG._9

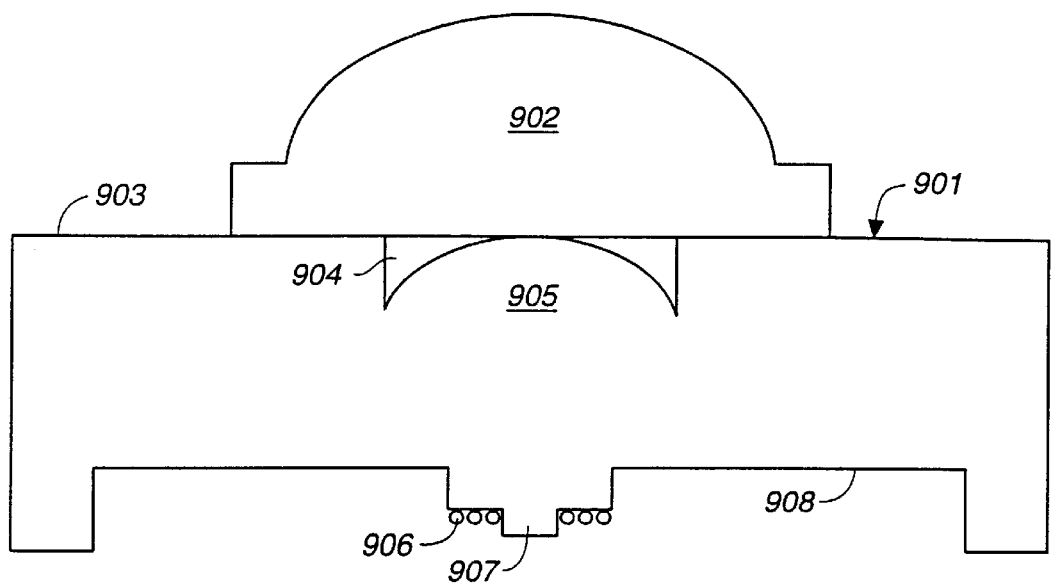
FIG._10
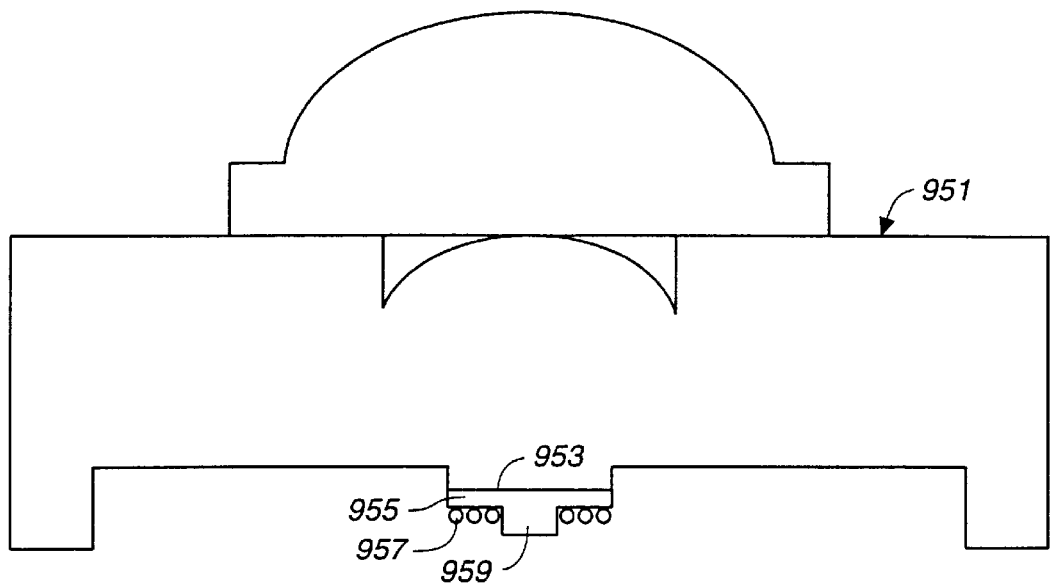
FIG._11

METHOD OF FABRICATING AND INTEGRATING AN OPTICAL ASSEMBLY INTO A FLYING HEAD

This is a divisional of U.S. application Ser. No. 08/657,145, filed Jun. 3, 1996, now U.S. Pat. No. 6,270,696.

BACKGROUND OF THE INVENTION

The present invention relates to methods for fabricating optical assemblies for optical recording heads, and more particularly to a method for fabricating optical assemblies for flying heads having solid immersion lenses.

Optical data storage systems are of great commercial and academic interest because of their potential for very high data density. In magnetic recording, the data density may be limited by particle size. In optical recording, the data density is often only limited by the diffraction limit of the illuminating light. In practice, the data density is in part also limited by the minimum diameter illuminating radiation such as a laser beam that can be focussed on the disk.

To reduce the laser spot diameter, several methods can be employed. Higher frequency light may help matters because it has a smaller wavelength. Increasing the numerical aperture of the lens may also help to decrease spot size.

One way of improving resolution is to use a solid immersion lens (SIL). These lenses, among other advantages, partially avoid diffraction effects, thus allowing higher data densities.

An object of the invention is to provide a method of fabricating an optical assembly in which a SIL is fabricated or installed for optimum data densities.

Another object of the present invention is to fabricate a slider system for a flying head having an objective lens and SIL which are in focus without the need for automatic focusing.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the claims.

SUMMARY OF THE INVENTION

In one aspect, the present invention is directed to a method of manufacturing an optical assembly in a mold. A first step locates a substrate in the mold. The substrate—may have a first opening adjacent the top of the substrate, a second opening adjacent the bottom of the substrate, and a volume between the first and second openings which is substantially empty. The first opening may have a radius greater than the second opening and the first and second openings may be substantially concentric. Another step may be injecting a transparent material into a volume between the first and second openings such that a solid immersion lens is formed when the material hardens.

Implementations of the method may include the following features. A magnetic coil may be located on the substrate substantially concentric with and adjacent to the second opening. The material may be injected through the second opening.

In another aspect, the invention is directed to a method of manufacturing an optical assembly. A first step is forming a solid immersion lens. Another step may be placing a solid immersion lens into a tapered hole located between a first and a second opening in a substrate.

In a further aspect, the invention is directed to a method of fabricating an optical assembly, including the steps of forming a tapered hole in a substrate, forming a solid immersion lens having a tapered portion, and placing the tapered portion of the solid immersion lens into the tapered hole in the substrate.

In a further aspect, the invention is directed to a method of fabricating an optical assembly in a mold, including a first step of locating a substrate in a mold. The substrate may have a first opening adjacent the top of the substrate, a second opening adjacent the bottom of the substrate, a volume between the first and second openings and a magnetic coil substantially concentric with and adjacent to the second opening. The first opening may have a radius greater than the second opening and the first and second openings may be substantially concentric. Other steps may include locating a partial solid immersion lens on the top of the substrate adjacent and overlapping the first opening, and injecting a transparent material into a volume between the first and second openings so that the partial solid immersion lens and the injected material together form a solid immersion lens.

In a further aspect, the invention is directed to a method of manufacturing an optical assembly. The method includes steps of forming a solid immersion lens having a curved surface and a flat portion; forming, placing or shaping a mesa on the flat portion of the solid immersion lens; and placing the solid immersion lens into a hole in a substrate. Implementations of the invention include the following features. A thin film magneto-optic coil may be deposited adjacent to and encircling the mesa. The mesa may be formed, for example, by grinding the flat portion of the solid immersion lens, chemically etching the flat portion of the solid immersion lens, or depositing the mesa through a mask.

In a further aspect, the invention is directed to a method of manufacturing an optical assembly. The method includes the steps of forming a tapered solid immersion lens having a spherical portion and a flat mesa portion and placing the tapered solid immersion lens into a tapered hole in a substrate.

In a further aspect, the invention is directed to a method of manufacturing an optical assembly. The method includes the steps of forming a solid immersion lens having a spherical portion and a flat portion, placing the solid immersion lens into a hole in a substrate, forming a mesa on the flat portion of the solid immersion lens, forming a separate thin film having a hole therethrough, fabricating a magnetic coil on the thin film, such that the center of the coil is near the center of the hole, and mounting the thin film on the substrate such that the mesa at least partially protrudes through the hole and magnetic coil. In an implementation of the method, the thin film may be silicon nitride (SiN).

In a further implementation, the invention is directed to mounting a substrate and optical assembly in a slider having an air bearing surface and a top surface such that the flat portion of the solid immersion lens is approximately co-planar with the air bearing surface. An objective lens may be placed on or near the top surface of the slider. In this way, the slider, the objective lens, and the solid immersion lens maintain fixed distances from each other.

In a further implementation, the slider or the solid immersion lens may be lapped such that the mesa of the solid immersion lens is approximately co-planar with the air-bearing surface of the slider.

In a further aspect, the invention is directed to a method of integrating an optical assembly into a slider. The method includes the steps of forming a substantially transparent slider having a void in a top surface thereof, installing a partial solid immersion lens into the void, placing an objective lens on or near the top surface of the slider, and forming a mesa that extends from a bottom surface of the slider. The slider, the partial solid immersion lens, the objective lens, and the mesa may maintain a fixed relationship with respect to each other.

In a further aspect, the invention is directed to a method of integrating an optical assembly into a slider. The method includes steps of forming a substantially transparent slider having a partial solid immersion lens formed therein, placing an objective lens on or near the top surface of the slider, and forming a mesa that extends from a bottom surface of the slider.

In a further aspect, the invention is directed to a method of integrating an optical assembly into a slider. The method includes steps of forming a substantially transparent slider having a void in a top surface thereof, installing a partial solid immersion lens into the void, placing an objective lens on or near the top surface of the slider, placing a glass plate on a bottom surface of the slider, and forming a mesa that extends from the glass plate. The slider, the partial solid immersion lens, the objective lens, the glass plate, and the mesa maintain a fixed relationship with respect to each other.

In a further aspect, the invention is directed to a method of integrating an optical assembly into a slider. The method includes the steps of forming a substantially transparent slider having a partial solid immersion lens formed therein, placing an objective lens on or near a top surface of the slider, placing a glass plate on a bottom surface of the slider, and forming a mesa that extends from the glass plate.

Implementations of the above aspects include the following features. A coil may be mounted adjacent the mesa. The coil may encircle the mesa.

The solid immersion lens may be formed by grinding, machining, lapping, or molding. The solid immersion lens may have a conical or pyramidal portion.

The injected material may be, for example, liquid glass or plastic with an index of refraction approximately equal to the index of refraction of the partial solid immersion lens.

Advantages of the invention include the following. An optical assembly having a SIL for high data densities may be manufactured in a simple fashion. The fabrication technique allows the optical components to maintain a fixed focus, eliminating the need for an active focussing mechanism.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIG. 1 is a cross-sectional view of an optical assembly having a super-hemispherical SIL according to an embodiment of the invention, as installed in a slider system.

FIG. 2 is a cross-sectional view of an optical assembly having a hemispherical SIL according to an embodiment of the invention, as installed in a slider system.

FIG. 3 is a cross-sectional side view of a mold used in a first embodiment of the invention.

FIG. 4 is a cross-sectional side view of a mounted solid immersion lens used in a second embodiment of the invention.

FIG. 5 is a cross-sectional side view of a mounted partial solid immersion lens used in a third embodiment of the invention.

FIG. 6($a$) is a side view of a mounted partial solid immersion lens with a mesa used in a fourth embodiment of the invention.

FIG. 6($b$) is a bottom view of a mounted partial solid immersion lens with a mesa used in a fourth embodiment of the invention.

FIG. 7 is a cross-sectional view of a mounted solid immersion lens as implemented within the body of a slider.

FIG. 8 is a cross-sectional view of a mounted solid immersion lens as implemented within the body of a transparent slider in the case where the solid immersion lens is not integral with the slider.

FIG. 9 is a cross-sectional view of a mounted solid immersion lens as implemented within the body of a transparent slider in the case where the solid immersion lens is not integral with the slider. A mesa formed from a separate glass slab is also shown.

FIG. 10 is a cross-sectional view of a mounted solid immersion lens as implemented within the body of a transparent slider in the case where the solid immersion lens is integral with the slider.

FIG. 11 is a cross-sectional view of a mounted solid immersion lens as implemented within the body of a transparent slider in the case where the solid immersion lens is integral with the slider. A mesa formed from a separate glass slab is also shown.

DETAILED DESCRIPTION OF THE PREFERRED EMBODIMENTS

The present invention relates to flying heads for optical disk recording systems. An optical disk recording system usually includes a head used for reading and writing data. The head includes a slider which among other things provides air-bearing surfaces which "fly" over the surface of the optical recording medium. The slider also provides a mounting for certain of the optical components. Data is usually read by a laser beam, which may be provided by a laser located away from the flying head.

FIGS. 1 and 2 illustrate an embodiment of the invention as fabricated. A head 50 is shown located generally adjacent a disk 61, as in a disk drive. Disk 61 is also referred to herein as an optical recording medium. In this position, head 50 may be reading data from or writing data to disk 61.

Head 50 is shown as having constituent optics together with slider 51.

The constituent optics may include a reflector 59, an objective lens 58, and a SIL 54. Each of these may be mounted to the slider 51. SIL 54 can be substantially or entirely contained within slider 51. Objective lens 58 is mounted onto or near a top surface 60 of slider 51 to focus the incident electromagnetic radiation, such as a laser beam, onto SIL 54. The incident laser beam may be, for example, from a source away from head 50. An optical clear path 53 is provided between SIL 54 and objective lens 58 so that the electromagnetic radiation, such as a laser beam, may be effectively transmitted from one to the other and back again.

Optical clear path 53 is constituted of any optically transparent material, and may be air, glass, optically clear plastic, and so on.

The electromagnetic radiation travelling through the optical clear path 53 is incident on the SIL. The SIL can be a single glass partial sphere or a lesser portion of a partial sphere plus a glass flat. SIL 54 generally has a curved surface 55 surrounding the partial spherical portion and a flat portion 56. Flat portion 56 may have a glass plate or mesa bonded to it. The term "mesa" is used here to refer to an optically transparent projection depending from flat portion 56. The mesa may be employed to act as the lower section of the SIL, as described below. Curved surface 55 and flat portion 56 may be entirely contained within the body of the slider 51. The flat portion 56 may be generally co-planar with or in the vicinity of the air-bearing surface 52. Such geometry can assist the flight of the head over the disk, and forms part of the total slider air bearing surface.

At least two versions of the SIL may be used in the present invention. An embodiment using a super-hemispherical SIL 54 is shown in FIG. 1, and an embodiment using a hemispherical SIL 75 is shown in FIG. 2.

The hemispherical SIL 75 is shaped as a hemisphere of radius approximately r and has a flat portion 71 which can wholly contain approximately one diameter of the partial spherical section. The super-hemispherical SIL 54, on the other hand, referring back to FIG. 1, is a truncated sphere. The flat surface of the super-hemispherical SIL 54 contains no complete diameters of the spherical section (although it may intersect at least one diameter at one point). Because this constitutes a hemisphere plus a "zone of a sphere", where the latter is defined as the portion of a sphere contained between two parallel planes both intersecting the sphere, it is termed a "super-hemisphere".

The total thickness of the super-hemispherical SIL is fabricated to be between r and $r(1+1/n)$, where r is the radius of the partial spherical section and n is the index of refraction of the constituent material of the super-hemisphere.

Any SIL dimensioned between r and $r(1+1/n)$ may be used. The choice of such a thickness results in a properly focused spot on the base of the SIL. If a partial sphere thickness of less than the desired SIL thickness is used, the amount by which the thickness of the SIL is less than that required can be made up by an equivalent optical distance of a glass plate or mesa, the formation of which is described below.

The thickness of either SIL type is also dependent on the index of refraction and thickness of any transparent media top coatings between the bottom surface of the SIL and a recording or readout layer on the disk. Such coatings may typically be protective dielectric layers of SiN. A lubricant layer may also be added.

The SIL can be manufactured to have a slightly larger thickness than noted above. In this way, upon installation of the SIL and substrate into the slider, the flat portion of the SIL may be lapped or grinded to make the bottom of the SIL, which may be the mesa, coplanar with the air bearing surface of the slider and total thickness approximately to the required SIL thickness. The amount of SIL that is grinded may be, for example, two to ten microns.

SIL 54 or 75 focusses a laser beam, which may come from a source away from the head, in the near vicinity of flat portion 56 or 71, respectively. With respect to FIG. 1, the converging rays from the objective lens 58 enter the curved surface 55 of SIL 54. Placement of the SIL 54 in the system then can focus the spot in proximity to the flat bottom portion 56 of the SIL 54. This is because the incoming converging rays from the objective lens 58 are refracted at curved surface 55, resulting in an increased effective incident angle. This can result in an increase in the effective numerical aperture. In a hemispherical SIL, the increased effective numerical aperture can rise with n. In a super-hemispherical SIL, the increased effective numerical aperture can rise as $n^2$.

The focussed beam thus converges near the flat portion 56 of the SIL 54. The disk 61 is normally located less than a wavelength away from the flat portion 56 of the SIL 54 in the near-field situation. In this way, evanescent waves may couple the small spot near or on portion 56 to the disk 61. These evanescent waves generally extend a distance less than a wavelength from the flat portion 56 of the SIL 54 before being significantly attenuated. In the case where the near-field situation is not used, i.e. where the total numerical aperture is less than unity, the disk may be further from the flat surface of the SIL.

Referring to FIG. 3, a first embodiment of an optical assembly 150 includes a substrate 101 which is placed in an injection molding system having a top mold 102 and a bottom mold 103. Top mold 102 may have a dimple 104 having a partial spherical shape. Bottom mold 103 usually has a tapered mold section 107 leading to an injection port 106.

A substrate 101 which may be used in the mold is often made of silicon, but may also be made of glass. Tapered hole 108 is formed in substrate 101. The shape of tapered hole 108 may be conical, pyramidal, frustal, as well as other tapered shapes.

A transparent material is then injected into the space formed by dimple 104 and tapered hole 108. This material may be any of the types commonly used in injection molding, and is usually glass or plastic. The material is usually injected through injection port 106, but may also be injected from ports at other locations. Upon hardening, this material assumes a shape of a SIL 105. SIL 105 has a curved portion 109, a flat portion 111, and a tapered portion 110. The shape of SIL 105, and more particularly the tapered portion, as well as that of SILs in the following embodiments, may be conical, pyramidal, frustal, etc.

If the invention is operated in a phase-change media recording mode, or if only reading is required, no further modification is necessary. In more common modes of magneto-optical recording, a magnetic coil is required. For this embodiment and those following, a magnetic coil may be added to the assembly as described below. The magnetic coil may be protected with a coating such as, for example, SiN, alumina, photoresist, a polymer, and so on.

Magnetic coil 112 may be mounted to substrate 101. Often magnetic coil 112 is mounted to substrate 101 prior to the introduction of substrate 101 in the mold. Magnetic coil 112 may also be placed in the substrate 101 after the molding of SIL 105. Once SIL 105 is formed and magnetic coil 112 is mounted to substrate 101, optical assembly 150 may be installed in a slider for use in a disk drive, as described below.

Referring to FIG. 4, a second embodiment of the method of making an optical assembly 250 includes preforming a SIL 205 before it is placed in a tapered hole 208 in a substrate 201. In this embodiment, SIL 205 is separately formed by, for example, grinding, machining, lapping, or by a separate molding operation.

In this embodiment, a coil 212 can be pre-mounted to substrate 201 or mounted after the introduction of substrate 201. Coil 212 can be planar and is usually approximately concentric with tapered hole 208 in substrate 201. SIL 205 is installed in tapered hole 208 and may protrude through the plane of coil 212. Once assembled, optical assembly 250 may be installed in a slider.

Referring to FIG. 5, a third embodiment includes a partial SIL 305 initially mounted to substrate 301. In this embodiment, partial SIL 305 is separately formed by, for example, grinding, machining, lapping, or by a separate molding operation. This partial SIL 305 generally covers one side of the tapered hole 308 in substrate 301 and may overhang the edge of substrate 301. Liquid glass, plastic, or other such material having a high index of refraction is then injected into the space formed by tapered hole 308 and partial SIL 305. The index of refraction of the injected material is often similar to that of partial SIL 305. A coil 312 may be mounted on substrate 301 either before or after the material is injected. The combination of partial SIL 305, the injected material, substrate 301 and coil 312 forms an optical assembly 350.

Referring to FIG. 6(a), a fourth embodiment includes a partial SIL 405 on which is mounted a glass plate 429. Glass plate 429 is attached to a mesa 421, which may alternatively be formed from a portion of glass plate 429. Mesa 421 may be employed to act as the lower section of the SIL. A complete SIL is thus formed from partial SIL 405, glass plate 429 and mesa 421. The complete SIL so formed can be either a hemisphere or super-hemisphere. The use of mesa 421 allows for the removal of part of the SIL because the refracted light does not extensively use the lower periphery of the SIL. More room can thus be gained for the placement of coil 412.

For convenience in a particular setup, the coil may be fabricated and installed away from the surface of the mesa 421 to reduce the total air bearing surface of the slider. In another implementation, the coil may be installed such that the plane of the coil is perpendicular to the plane of the disk. In this case, a device such as a permanent magnet or an electromagnet of proper geometry may be used to rotate the field around a 90° angle so that the field can again couple to the disk.

Mesa 421 can be formed in several ways from glass plate 429 which has approximately the same index of refraction as partial SIL 405. For example, glass plate 429 can have a section removed by grinding, leaving mesa 421. In another method, glass plate 429 can be etched, with the non-etched portion or the less-etched portion leaving mesa 421. In a third way, glass plate 429 can be appropriately masked, and mesa 421 can be deposited onto glass plate 429 by various deposition methods including sputtering, evaporation, etc. In a fourth way of fabricating mesa 421, a mold may be used which simultaneously forms partial SIL 405, mesa 421 and optionally glass plate 429.

Prior to or after the formation of mesa 421, partial sphere 405 may be mounted to glass plate 429 by appropriate bonding techniques.

Referring to FIG. 6(b), a magnetic coil 412 encircles mesa 421. This magnetic coil 412 may be formed by, for example, deposition or plating before or after mesa 412 is formed. Magnetic coil 412 may be of various shapes, for example, rectangular, circular, octagonal, etc., and may have various numbers of turns.

A fifth embodiment includes a separate coil which is formed on a thin film. A thin film magneto-optic coil can be fabricated on a thin membrane substrate such as SiN. This micro-coil may be plated or sputtered onto a thin membrane which is temporarily supported by a thick substrate such as silicon. The thin film has a hole etched or cut through its thickness. The center of this hole is approximately in the same location as the coil center.

The thin film may be removed from the thick substrate and mounted to the flat portion of the SIL lens using various bonding techniques such as various adhesives. If a mesa portion is used in this embodiment, the mesa may protrude through the hole in the thin film and the magnetic coil.

Referring to FIG. 7, the optical assembly 502 is shown installed in a slider 516 of a magneto-optic recording head 501. A head 501 is shown located generally adjacent a disk 528, as in a disk drive. Disk 528 is also referred to herein as an optical recording medium. In this position, head 501 may be reading data from or writing data to disk 528. Slider 516 has an air-bearing surface 522 surrounding a channel surface 536. Optical assembly 502 is installed in a cavity or slot adjacent channel surface 536. The optical assembly is bonded into place by methods which an include ultraviolet adhesives or epoxies.

Slider 516 provides an optical clear path 520 between SIL 505 and an objective lens 504 so that electromagnetic radiation such as a laser beam may be effectively transmitted from one to the other and back again. The laser beam may emerge from, for example, a source away from the slider. optical assembly 502 is installed such that SIL 505 is substantially or entirely contained within the body of slider 516. Mesa 521 is coplanar with or in the vicinity of air bearing surface 522. objective lens 504 is mounted to or near the top surface 534 of slider 516. Lens 504 is adjusted by translation in (x,y,z)-directions and also in a tilt direction. The "tilt direction" refers to the angle the optical axis of objective lens 504 makes with the optical axis of optical assembly 502. A zero tilt means these axes are parallel. Such translation and tilt may be accomplished by a computer-automated mounting tool. The objective lens is adjusted until the laser beam diameter produces the minimum spot size at the recording or readout layer surface 554. The amount of adjustment usually depends on considerations of the numerical aperture and working distance of the objective lens, the SIL type (whether hemispherical or super-hemispherical), and the index of refraction of the SIL. There is also occasionally the need to better guide the laser beam into objective lens 504 on slider 516. To accomplish this, a reflector (not shown) may be installed above objective lens 504 on the slider to guide the beam into objective lens 504. This reflector may be, e.g., a mirror or prism. The reflector may alternatively be mounted on an arm coupled to the coarse actuator.

A coil 512 can circle the base of the SIL. The center opening of coil 512 generally allows for the focussed laser beam to pass through. The shape of coil 512 and its opening may be elongated in one direction to allow a tilted beam to pass in an unhindered manner in the tracking dimension on the optical disk medium. In this way, the coil may be as close as possible to the mesa without interfering with the beam path.

Because the objective lens 504, optical clear path 520, and optical assembly 502 can all be mounted to slider 516, they can be stationary with respect to one another. Therefore, a beam which is focussed can be so maintained so long as the distance between the surface of the mesa 521 (or any other component of the head 501) and the disk 528 is maintained constant. Therefore, there is no need for active focussing, as a proper focus can be maintained automatically in part because of the geometry of the system.

The optical components described may vary, for example objective lens 504 can have a micro-focussing feature and an individual numerical aperture of 0.45 to 1.0. It may be made of, among other materials, glass or plastic. It has a mass typically of less than 35 milligrams.

The partial spherical portion of either the hemispherical or super-hemispherical SIL can have a radius of less than or about 2 millimeters. For example, SILs having radii of 0.5 mm can be used. The SIL material's index of refraction can be in the range of 1.4 to 2.5.

The optical recording medium can be a magneto-optical material or a phase-change type material deposited on a media substrate 550. In FIG. 7, magneto-optical material layer 554 is shown. The magneto-optical material may be a rare earth—transition metal compound. Examples of suitable such magneto-optical materials are TbFeCo. Media substrate 550 can be plastic, glass, or aluminum.

To increase the signal, a reflector layer 552, such as aluminum, and a transparent dielectric layer 553, such as SiN, can be placed between the magneto-optical material and the media substrate.

For protection of the magneto-optical material, on the side of the magneto-optical material opposite the media substrate can be located a transparent dielectric material 556 such as SiN.

In the above embodiments, the optical assembly was formed separately from the slider. In the below embodiments, at least part of the optical assembly is formed as part of the slider.

Referring to FIG. 8, a sixth embodiment is shown in which a slider 606 has an integral mesa 621 formed on a channel surface 636. Slider 606 is made from a clear material such as glass or plastic using processes such as machining, grinding or injection molding, etc. A void 647 is removed from a top surface 634 of slider 606. A partial SIL may be installed in void 647; here the SIL, hemispherical or super-hemispherical, is formed by the combination of partial sphere 605, slider body 606 and mesa 621. An objective lens 604 may be mounted on or near the top surface 634.

FIG. 9 shows a related embodiment where a glass slab 862 is placed on a projection 864 which extends from channel surface 836 of slider 806. Glass slab 862 has a mesa 821 formed thereon as described above. A magnetic coil 812, adjacent to mesa 821 may also be part of glass slab 862. Coil 812 may be deposited, plated, or bonded adjacent to mesa 821.

Referring to FIG. 10, a seventh embodiment is shown in which a slider 901 has an integral partial SIL 905 formed in a void 904 on a top surface 903 of slider 901. Partial SIL 905 and slider 901 may be formed by, for example, injection molding, machining, or grinding. An integral mesa 907 is formed on a channel surface 908. The complete SIL is formed of partial SIL 905, slider 901 and mesa 907. An objective lens 902 may be mounted on or near top surface 903. This complete SIL may be hemispherical or super-hemispherical.

FIG. 11 shows a related embodiment having a separate step in which a glass slab 955 is placed on a projection 953 which extends from slider 951. Glass slab 955 has a mesa 959 formed thereon as described above. A magnetic coil 957, adjacent to mesa 959 may also be formed on glass slab 955. Coil 957 may be deposited, plated, or bonded adjacent to mesa 959.

The present invention has been described in terms of preferred embodiments. The invention, however, is not limited to the embodiment depicted and described. For example, variations in materials (and therefore variations in indices of refraction) of the optical components may be used, as well as certain variations in their optical parameters such as numerical aperture. Moreover, the invention may be used in a number of types of optical recording and playback.

Therefore, the scope of invention is defined by the appended claims.

What is claimed is:

1. A method of integrating an optical assembly into a slider, comprising the steps of:
    (a) forming a substantially transparent slider having a void in a top surface thereof;
    (b) installing a partial solid immersion lens into the void;
    (c) placing an objective lens on or near the top surface of the slider; and
    (d) forming a mesa that extends from a bottom surface of the slider;
    such that the slider, the partial solid immersion lens, the objective lens, and the mesa maintain a fixed relationship with respect to each other.

2. The method of claim 1, further comprising the step of depositing or mounting a coil adjacent the mesa.

3. The method of claim 2, wherein the coil encircles the mesa.

4. A method of integrating an optical assembly into a slider, comprising the steps of:
    (a) forming a substantially transparent slider having a partial solid immersion lens formed therein;
    (b) placing an objective lens on or near a top surface of the slider; and
    (d) forming a mesa that extends from a bottom surface of the slider;
    such that the slider, the partial solid immersion lens, the objective lens, and the mesa maintain fixed distances from each other.

5. The method of claim 4, further comprising the step of depositing or mounting a coil adjacent the mesa.

6. The method of claim 5, wherein the coil encircles the mesa.

7. A method of integrating an optical assembly into a slider, comprising the steps of:
    (a) forming a substantially transparent slider having a void in a top surface thereof;
    (b) installing a partial solid immersion lens into the void;
    (c) placing an objective lens on or near the top surface of the slider;
    (d) placing a glass plate on a bottom surface of the slider; and
    (e) forming a mesa that extends from the glass plate;
    such that the slider, the partial solid immersion lens, the objective lens, the glass plate, and the mesa maintain a fixed relationship with respect to each other.

8. The method of claim 7, further comprising the step of depositing or mounting a coil adjacent the mesa.

9. The method of claim 8, wherein the coil encircles the mesa.

10. A method of integrating an optical assembly into a slider, comprising the steps of:
    (a) forming a substantially transparent slider having a partial solid immersion lens formed therein;
    (b) placing an objective lens on or near a top surface of the slider;
    (c) placing a glass plate on a bottom surface of the slider; and
    (d) forming a mesa that extends from the glass plate;
    such that the slider, the partial solid immersion lens, the objective lens, and the mesa maintain fixed distances from each other.

11. The method of claim 10, further comprising the step of depositing or mounting a coil adjacent the mesa.

12. The method of claim 11, wherein the coil encircles the mesa.

13. A method, comprising:
   (a) forming a substantially transparent slider having a partial solid immersion lens formed as an integral part thereof; and
   (b) placing an objective lens on or near a top surface of the slider at a fixed position relative to the slider; and
   d) forming a transparent mesa on a bottom surface of the slider in a position such that the partial solid immersion lens and the transparent mesa are aligned along an optic axis of the objective lens.

14. The method as in claim 13, wherein the transparent mesa is an integral part of the bottom surface of the slider.

15. The method as in claim 13, further comprising attaching a transparent plate to the bottom surface of the slider, wherein the transparent plate has a portion shaped to form the transparent mesa.

* * * * *